United States Patent [19]

Stevens et al.

[11] Patent Number: 4,636,541

[45] Date of Patent: Jan. 13, 1987

[54] WATER-DISPERSIBLE CATIONIC VINYLIZED EPOXY RESINS

[75] Inventors: Michael G. Stevens, Worthington, Ohio; Rhetta Q. Davis, Lake Jackson, Tex.

[73] Assignee: The Dow Chemical Company, Midland, Mich.

[21] Appl. No.: 717,195

[22] Filed: Mar. 28, 1985

[51] Int. Cl.[4] .................. C09D 3/58; C09D 3/56; C09D 3/52; C09D 5/02

[52] U.S. Cl. .................................. 523/404; 523/414

[58] Field of Search ............................ 523/404, 414

[56] References Cited

U.S. PATENT DOCUMENTS

| | | | |
|---|---|---|---|
| 3,066,112 | 11/1962 | Bowen | 523/116 |
| 3,178,623 | 4/1965 | Robinson | 361/304 |
| 3,256,226 | 6/1966 | Fekete et al. | 525/7 |
| 3,301,743 | 1/1967 | Fekete et al. | 523/523 |
| 3,367,992 | 2/1968 | Bearden | 523/400 |
| 3,936,405 | 2/1976 | Sturni et al. | 523/402 |
| 3,959,106 | 5/1976 | Bosso et al. | 524/405 |
| 3,962,165 | 6/1976 | Bosso et al. | 523/414 |
| 4,035,275 | 7/1977 | Sturni et al. | 204/181.7 |

*Primary Examiner*—Ronald W. Griffin

[57] ABSTRACT

Novel water-compatible compositions are those of at least one vinyl ester resin whose backbone is linear or substantially linear and consists essentially of at least one terminal olefinically unsaturated group and at least one terminal pyridinium group covalently bonded through the pyridinium nitrogen atom. These novel compositions are useful adhesive and coating compositions which find particular utility in cathodic electrodeposition. The compositions are prepared, for example, by reacting a linear or substantially linear epoxy resin with an unsaturated monocarboxylic acid and then with a pyridine compound in the presence of sufficient amount of a Brönsted acid and water to stabilize the pyridinium salt thus formed.

16 Claims, No Drawings

WATER-DISPERSIBLE CATIONIC VINYLIZED EPOXY RESINS

BACKGROUND OF THE INVENTION

1. Field of the Invention

This invention pertains to novel water-compatible resinous compositions comprising one or more cationic compounds which comprise vinylized epoxy resins having at least one terminal unsaturated group and one terminal pyridinium salt group. This invention further pertains to the inclusion of said compounds in aqueous dispersions and to the use of such aqueous dispersions as coatings and adhesives.

2. Description of the Prior Art

The term "cationic compounds" embraces a variety of organic compounds which ionize in the presence of water to form a cation (i.e., a molecule bearing a positive electrical charge). This positive charge is almost always borne by a hetero atom of phosphorus, nitrogen or sulfur. In some instances, the positive charge has been borne by a combination of carbon atoms and hetero atoms (e.g., an isothiouronium group). Such positively charged portions of the molecules have an affinity for water and can render the molecules water-compatible, i.e., either water-soluble or water-dispersible; this property has caused such organic compounds to be the subject of intensive investigation and commercialization. A brief scan through any handbook on surfactants (e.g., McCutcheon's Detergents and Emulsifiers, North American Edition, 1977) will show the extent to which such compounds have been utilized.

Cationic compounds in which the positive charge is borne by a nitrogen atom are probably the best known and most widely used. Perhaps it is because of this wide usage, or because of the evolutionary nature of the technology, that the chemical nomenclature for such compounds has been abused and inconsistently used. Such compounds have been mistakenly referred to in much of the early literature as merely "quaternary ammonium" compounds. Quaternary ammonium compounds are compounds in which the nitrogen atom is bonded to four carbon atoms by way of four single covalent bonds.

There is a separate and distinct class of nitrogen-containing organic compounds which are referred to as aromatic heterocyclic amines. Aromatic heterocyclic amines have one (or more) nitrogen atoms as a member of a heterocyclic aromatic ring. Such aromatic amines are normally 5- or 6-membered rings. The 6-membered mononuclear heterocyclic ring systems containing one nitrogen atom are by far the more common and are generically referred to as pyridines. These aromatic amines can be alkylated to form pyridinium compounds as illustrated below:

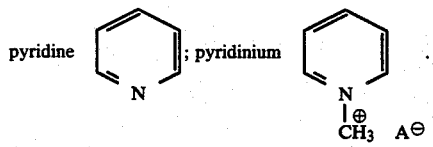

Some elementary organic texts (and a few other technical writings) have included pyridiniums under the terminology "quaternary ammonium" compounds. Almost invariably, the point being made in such instances was that a pyridine is a nitrogen-containing organic base which can be protonated to form an acid/amine salt (e.g., a pyridine hydrochloride) even though the pyridines are much less basic. However, the organic chemist who is knowledgable regarding pyridines and pyridinium compounds will not be misled by such erroneous terminology because the chemical and physical properties of the compounds per se render them substantially different from the true quaternary ammonium compounds having four carbon atoms bonded to nitrogen by single covalent bonds.

SUMMARY OF THE INVENTION

We have now discovered a novel class of water-compatible compositions which comprise one or more vinylized epoxy resins (e.g., vinyl ester resins) which bears at least one terminal unsaturated group and at least one terminal pyridinium group covalently bonded through the pyridinium nitrogen atom. Depending upon the molecular weight of the resinous compounds and the number of pyridinium groups, the novel compositions range from water-soluble compositions having superb surfactant properties to water-dispersible compositions which are readily combined with water to form artificial latexes. The average molecular weight of these compounds ranges from about 400 to about 7000 (preferably from about 900 to about 4000). Aqueous dispersions comprising the novel pyridinium compositions are excellent coating and adhesive compositions.

DEFINITIONS

By "water-soluble" is meant a resinous compound which forms a thermodynamically stable mixture with water. The mixtures form spontaneously and have been referred to in the prior art as true solutions if the individual molecules are dispersed, and as micellar or colloidal solutions if the molecules exist in an aggregated state.

In contrast, by "water-dispersible" is meant a resinous compound which can be dispersed in water without the use of surfactants to form an artificial latex which is meta-stable in the thermodynamic sense. The resin does not, however, spontaneously form a colloidal solution.

Those skilled in the art recognize that the boundary between water-soluble and water-dispersible is not sharp. The transition from one class to the other depends on resin polarity, molecular weight, charge density, type of counter ion and the level of coupling solvents. In many cases, the resin comprises a mixture of water-soluble and water-dispersible species.

In this specification, aqueous dispersions comprised of water-insoluble preformed polymers are termed artificial latexes as contrasted with synthetic latexes formed directly by emulsion polymerization. According to some conventions, the non-film forming artificial latexes are categorized as aqueous dispersions (i.e., solid particles dispersed in liquid). Film-forming latexes, by analogy, are categorized as emulsions (i.e., liquid dispersed in liquid). The term "artificial latex", therefore, includes both types as well as mixtures also containing water-soluble polymers.

"Artificial latexes" are latexes produced by the dispersion or redispersion of pre-formed water-insoluble polymers or solutions thereof. Artificial latexes are produced by known emulsification processes, e.g., by addition of water with stirring until phase inversion occurs, by high shear mixing with water at elevated temperatures or by dilution of a mixture of water and a water-miscible solvent followed by stripping to remove the solvent. Such artificial latexes are produced from polymers which are not prepared readily from monomers by emulsion polymerization.

DETAILED DESCRIPTION OF THE INVENTION

The novel water-compatible compositions are conveniently and preferably prepared by reacting a vinyl ester resin having at least one terminal unsaturated group with a pyridine in the presence of sufficient amounts of a Brönsted acid (i.e., a protic acid) and water to stabilize the pyridinium salt thus formed.

Vinyl ester resins are described in U.S. Pat. No. 3,367,992 wherein dicarboxylic acid half esters of hydroxyalkyl acrylates or methacrylates are reacted with polyepoxide resins. Bowen in U.S. Pat. No. 3,066,112 describes the preparation of vinyl ester resins from monocarboxylic acids such as acrylic and methacrylic acid. Bowen also describes alternate methods of preparation wherein a glycidyl methacrylate or acrylate is reacted with the sodium salt of a dihydric phenol such as bisphenol-A. Vinyl ester resins based on epoxy novolac resins are described in U.S. Pat. No. 3,301,743 to Fekete et al. Fekete et al. also describe in U.S. Pat. No. 3,256,226 vinyl ester resins wherein the molecular weight of the polyepoxide is increased by reacting a dicarboxylic acid with the polyepoxide resin as well as acrylic acid, etc. All of the above-described resins, which contain the characteristic linkages:

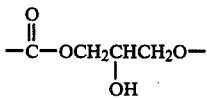

and terminal, polymerizable vinylidene groups, are classified as vinyl ester resins, and are incorporated herein by reference.

Briefly, any of the known polyepoxides may be employed in the preparation of the vinyl ester resins of this invention. Useful polyepoxides are glycidyl polyethers of both polyhydric alcohol and polyhydric phenols, epoxy novolacs, epoxidized fatty acids or drying oil acids, epoxidized diolefins, epoxidiezed di-unsaturated acid esters as well as epoxidezed unsaturated polyesters, so long as they contain more than one oxirane group per molecule. The polyepoxides may be monomeric or polymeric.

Preferred polyepoxides are glycidyl polyethers of polyhydric alcohols or polyhydric phenols having weights per epoxide group of about 150 to 2000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products area characterized by the presence of more than one epoxide group per molecule, i.e., a 1,2-epoxy equivalency greater than one.

Unsaturated monocarboxylic acids include acrylic acid, methacrylic acid, halogenated acrylic or methacrylic acid, cinnamic acid and the like and mixtures thereof, and hydroxyalkyl acrylate or methacrylate half esters of dicarboxyl acids as described in U.S. Pat. No. 3,367,992 wherein the hydroxyalky group preferably has from 2 to 6 carbon atoms.

The pyridines, of course, constitute a known class of compounds encompassing a wide variety of heterocyclic 6-membered compounds with a nitrogen atom included in the aromatic ring as the sole hetero atom. Pyridine per se ($C_5H_5N$) is the first member of the series. Inertly-substituted pyridines can also be used. Such substituted pyridines normally correspond to the formula

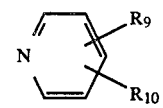

wherein $R_9$ and $R_{10}$ are each independently hydrogen, halo, hydrocarbyl, inertly-substituted hydrocarbyl or other inert substituents. By "inert" in every instance is meant that the substituent is inert in the process of forming the novel pyridinium resins. Preferred pyridines are those in which $R_{10}$ is hydrogen and $R_9$ is hydrogen or a substituent in the 3- or 4-ring position; more preferred are those in which $R_{10}$ is hydrogen and $R_9$ is hydrogen or 4-methyl. Examples of suitable such substituted pyridines include: 3-hydroxymethylpyridine, 3-methoxypyridine, 2-fluoropyridine, 3-chloropyridine, 3,5-dichloropyridine, 2-methylpyridine, 3-methylpyridine, 4-methylpyridine, 3,5-dimethylpyridine, 2-vinylpyridine, 4-vinylpyridine, 4-phenylpyridine, nicotinamide, 3-(3-pyridyl)-1-propanol, and the like.

Substantially any Brönsted acid can be used in forming the novel pyridinium compounds so long as the acid is sufficiently strong to promote the reaction between the pyridine and the vicinal epoxide group(s) on the resinous reactant. Monobasic acids are normally preferred. Suitable inorganic acids include, for example, phosphoric acid, hydrochloric acid, hydrobromic acid, nitric acid, sulfuric acid, etc. Suitable organic acids include, for example, alkanoic acids having from 1 to 4 carbon atoms (e.g., acetic acid, propionic acid, etc.), alkenoic acids having up to 5 carbon atoms (e.g., acrylic acid, methacrylic acid, itaconic acid, maleic acid, etc.) hydroxy-functional carboxylic acids (e.g., glycolic acid, lactic acid, citric acid, etc.) and organic sulfonic acids (e.g., methanesulfonic acid), and the like. The acid in this reaction has two important functions. First it promotes the reaction between the pyridine and the vicinal epoxy group on the vinyl ester resin. Second, the acid provides a compatible anion in the final product. Presently preferred acids are lower alkanoic acids of one to four carbon atoms and acrylic acid with lactic acid being most preferred. The anion can be exchanged, of course, by conventional anion exchange techniques as shown, for example, in U.S. Pat. No. 3,959,106 at column 19. Preferred anions are chloride, bromide, bisulfate, bicarbonate, nitrate, dihydrogen phosphate, lactate and alkanoates of 1-4 carbon atoms.

The ratio of vinyl ester resin/pyridine reactant/Brönsted acid is variable so long as the reaction mixture is at a neutral or acid pH. Stoichiometry of the reaction requires 1 equivalent of pyridine and 1 equivalent of Brönsted acid per vicinal epoxy group converted. Since there should be no unreacted epoxy groups, the amount of unsaturated acid used in esterification should be equivalent to the unconverted epoxy groups.

The relative amounts of reactants used depends upon the acid strength. Pyridines are very weak bases and form salts with strong acids (e.g., HCl). It is observed, for example, that reactions in which hydrochloric acid is added as pyridinium hydrochloride, the major product is the corresponding chlorohydrin. This result is, of course, the basis for using pyridinium hydrochloride to quantitatively determine the epoxy content of resins by the analytical technique described by Siggia in "Quantitative Organic Analysis Via Functional Groups" at page 242 (1963) and cited, for example, in U.S. Pat. No. 3,959,106 as showing the analytical standard in the art.

In order to form the instant pyridinium compounds from strong acids, an excess of pyridine is required. For example, excellent results were achieved using from about 2 to about 5 equivalents of pyridine per acid equivalent. With weaker acids, e.g., phosphoric acid, good results have been achieved by using substantially stoichiometric amounts of reactants although a slight excess or deficiency of the epoxy-containing reactant or pyridine can be used. With still weaker acids (e.g., carboxylic acids, such as acetic acid) a slight excess of acid is preferred to maximize the yield of pyridinium salts. Good results have been achieved using a ratio of about 1.1 equivalents of weak acid and one equivalent of pyridine per epoxy equivalent. The amount of water that is also included in the reaction mixture can be varied to convenience so long as there is sufficient acid and water present to stabilize the pyridinium salt formed during the course of the reaction. Normally, it has been found preferable to include water in the reaction in amounts of from about 10 to about 30 moles per epoxy equivalent.

Minor amounts of water-compatible organic solvents can be included in the reaction mixture. The presence of such solvents tends to facilitate contact of the reactants and thereby promote the reaction rate. In this sense, this particular reaction is not unlike many other chemical reactions and the use of such solvent modifiers is conventional. The skilled artisan will, therefore, be aware of which organic solvents can be included. One class of solvents that is particularly beneficial are the monoalkyl ethers of the $C_2$-$C_4$ alkylene glycols. This class of compounds includes, for example, the monomethyl ether of ethylene glycol, the monobutyl ether of ethylene glycol, etc. A variety of these alkyl ethers of alkylene glycols are commercially available.

The reaction is normally conducted by first preparing a partial vinyl ester resin by reaction of less than equivalent amounts of an unsaturated monocarboxylic acid with the polyepoxide leaving unreacted oxirane groups. The salt is then made by blending that partial vinyl ester, pyridine and acid reactants together and maintaining the reaction mixture at an elevated temperature until the reaction is complete or substantially complete. The progress of the reaction is easily monitored. The reaction is normally conducted with stirring and under an atmosphere of inert gas (e.g., nitrogen). Satisfactory reaction rates have been observed at temperatures of from about 25° C. to about 100° C. with preferred reaction rates being observed at temperatures from about 60° C. to about 80° C.

The products produced by this reaction of a pyridine with a vinyl ester resin having for purposes of illustration an average of one unsaturated group per molecule in the presence of acid and water are, of course, included within the novel class of water-compatible pyridinium compositions. This reaction product will typically comprise a statistical distribution of compounds in which most of the resinous molecules will contain one unsaturated group and one terminal pyridinium group; a number of the vinyl ester resin molecules will have two unsaturated ester terminal groups and will be nonionic species, and a number of resinous molecules will bear two terminal pyridinium groups. The significant point is however that the presence of such nonionic species is not detrimental in forming and/or using the artificial latexes and their presence can be advantageous. If desired, the components in the product mixture can be isolated by conventional fractionation methods, e.g., by fractional precipitation or by gradient elution chromatography.

While the resin may be cured, as is, it is may be combined with a copolymerizable vinyl monomer in order to vary the properties of the cured coating, etc. Most any vinyl monomer may be employed which is copolymerized with the unsaturated groups of the resin (principally acrylate and methacrylate groups).

Such monomers include both monovinyl and polyvinyl monomers. Typical monomers include the alkenyl aromatic monomers such as styrene, vinyl toluene, t-butyl styrene and the like; and alky and hydroxyalkyl esters of acrylic and methacrylic acid such as methyl, ethyl, propyl, butyl, cyclohexyl and hydroxyethyl, hydroxypropyl and hydroxybutyl acrylates and methacrylates. In addition to the above, other monomers especially useful for ultraviolet light curable systems such as 2-acetoxyalkyl acrylates, pentaerythritol di-, tri- or tetra-acrylate and the like may be used.

When the novel water-compatible compositions are to be used as coating compositions, they can be formulated with conventional additives, if desired. For example, antifoam agents, pigments, flow control agents, coupling solvents, coalescing solvents, plasticizers, etc., can be included so long as such materials are inert to the pyridinium-containing resinous materials. These conventional additives are well-known classes of compounds as illustrated for example, by the disclosure in U.S. Pat. No. 3,962,165 (incorporated by reference above).

We have observed that the novel water-compatible compositions having a charge/mass ratio of from about 0.6 to about 3 milliequivalents of pyridinium nitrogen per gram of resin solids (meq/g) are unusually effective as dispersants for pigments. Pigments used in electrocoating compositions form a known class of compounds comprising inorganic and/or organic pigments. This known class is illustrated by the pigments named in U.S. Pat. No. 3,936,405 and U.S. Pat. No. 4,035,275 (incorporated by reference above). The inorganic pigments (e.g., titanium dioxide, magnesium silicate, black iron oxide, aluminum silicate, china clay, lead silicate, carbon black, etc.) are the best known and most widely used in coating compositions. In making such dispersions, a sufficient amount of the water-compatible (preferably water-soluble) compositions is used to make a dispersion which is stable in a cationic environment. It is also observed that when such pigment dispersions are to be used in compositions for cathodic electrodeposition that the performance of the coating is enhanced by the inclusion of corrosion inhibiting pigments. Corrosion inhibiting pigments (i.e., pigments which increase the corrosion inhibitive effect of coatings containing such pigments) are represented, for example, by zinc yellow, basic zinc chromate, strontium chromate, calcium chromate, barium chromate, red lead and basic lead silico chromate.

The compositions are also useful as glass sizing, as tire cord adhesives, in polymer concrete and as the continuous phase of a reinforced composite.

The compositions will be more apparent from the following examples which illustrate the inventive concept but are not intended to be limiting.

EXAMPLE I

A 2-liter, 5-neck, round-bottom flask is charged with 408.6 g of a diglycidyl ether of bisphenol-A having an EEW of 182–190 (D.E.R. ® 331) and 88.3 g of bisphenol-A. That is heated to 80°–90° C. and 0.35 g of resin advancement catalyst, tetrabutyl phosphonium acetate, is added with a nitrogen purge. The mix is stirred at 150° C. and is held for 1.5 hours. The percent epoxide is 11.9 at the EEW is 361. The temperature is cooled to 110° C. and an air purge is started. Then 89.75 g of glacial methacrylic acid and 0.15 g of hydroquinone is added and stirred for 10 minutes. Then 0.60 g of 2,4,6-tri(dimethyl amino methyl)phenol (DMP 30) is added and the mixture slowly heated to 118° C. over 60 minutes and reacted at 118° C. until percent acid is less than 0.1 percent. The percent epoxide is 2.2 percent. The mix is cooled to 70° C. and 0.21 g of monomethyl-ether of hydroquinone and 0.16 g of phenothiazine are added. Next, 26.15 g of nicotinamide, 27.80 g of 88 percent lactic acid and 128.63 g of deionized water are mixed together and are added to the resin slowly over 30 to 60 minutes. After reacting for 4 hours, 649 g of water is added slowly at a rate of 10–20 ml/min. Properties are given in Table I.

EXAMPLE II

A 2-liter, 5-neck, round-bottom flask is charged with 330 g of a diglycidyl ether of bisphenol-A, (D.E.R. ® 383), having an EEW of 180–185, 92.9 g of bisphenol-A, and 79.76 g of carboxy-terminated butadiene-acrylonitrile polymer (Hycar CTBN), heated to 80°–90° C. and 0.66 g of resin advancement catalyst, tetrabutylphosphonium acetate, is added with a nitrogen purge. The mixture is stirred at 150° C. and held for 1.5 hours. The percent epoxide is 7.5. The temperature is cooled to 110° C., an air purge started and 54.3 g of glacial methacrylic acid and 0.22 g of hydroquinone are added. The mix is stirred to 10 minutes, 0.63 g of 2,4,6-tri(dimethylaminomethyl) phenol added, slowly heated to 118° C. over 60 minutes and reacted at 118° C. until percent acid is less than 0.1 percent. The percent epoxide is 2.5 percent. The mix is cooled to 70° C. and 0.03 g of phenothiazine added. Next, 29.67 g of nicotinamide, 31.50 g of lactic acid, and 146.5 g of deionized water are mixed and placed into a separatory funnel with a rubber tube leading to the flask. The mixture is added to the flask in 60 minutes. After reacting for 4 hours about 95 percent of the nicotinamide is reacted. Then 500 g of water is added at a rate of 15–20 ml/min. This forms a stable oil-in-water dispersion. The properties are given in Table I.

TABLE I

| | Physical Properties | | |
| --- | --- | --- | --- |
| Example | % Solids | Viscosity (cps) | Particle Size (A) |
| I | 45 | 328 | 2050 |
| II | 46 | 2612 | 1760 |

EXAMPLE III

An aqueous dispersion of a cationic vinyl ester resin was made according to the procedure of Example I using a diglycidyl ether of bisphenol-A having molecular weight enhancement with bisphenol-A and Hycar CTBN to an EEW of 570.

In contrast, the procedure was repeated using a diglycicyl ether of bisphenol-A having an EEW of 371.

The formulations for each procedure are shown in the following table.

| | Wt. (g) | Eq. | Eq./Eq. Epoxy |
| --- | --- | --- | --- |
| Epoxy Resin (EEW = 570) | 503.32 | 0.8819 | 1.0 |
| GMAA | 54.3 | 0.6314 | 0.716 |
| Nicotinamide | 29.67 | 0.2432 | 0.27 |
| Lactic Acid | 31.50 | 0.35 | 0.397 |
| GMAA = glacial methacrylic acid | | | |
| 0.394 meq. cation/g resin | | | |
| Stability >1 yr. | | | |
| Epoxy Resin (EEW = 371) | 533.65 | 1.3575 | 1.01 |
| GMAA | 87.71 | 1.0199 | 0.75 |
| Nicotinamide | 31.88 | 0.2613 | 0.19 |
| Lactic Acid | 29.81 | 0.3309 | 0.24 |
| GMAA = glacial methacrylic acid | | | |
| 0.399 meq. cation/g resin | | | |

After three days, the resin started separating out of the water. The resin redisperses upon shaking. After 25 days, the resin started congulating out of the water.

The comparative procedure was repeated using a polyepoxide of EEW equal to 363 and another EEW equal to 368. The former had 0.29 milliequivalent of N-cation per gram of resin and exhibited less than 12 hours of stability. The latter had 0.336 milliequivalent of N-cation per gram of resin and exhibited less than 2 days of stability.

EXAMPLE IV

In the procedure described below the ingredients are mixed and reacted in one step. The results show the dispersion stability to be very low.

A 2-liter, 5-neck, round-bottom flask was charged with 413.9 g of D.E.R. ® 331 epoxy resin and 89.4 g of bisphenol-A, heated to 80° C., and 0.35 g of resin advancement catalyst, tetrabutylphosphonium acetate added with a nitrogen purge. The mix is stirred at 150° C. and held for 1.5 hours. The percent epoxide is 11.9. The temperature is cooled to 80° C. and 0.15 g of hydroquinone and a solution of 116.54 g glacial methacrylate acid (1.3552 eq.), 33.07 g of nicotinamide, and 36.59 g of water are added. The reaction continues until percent acid is less than 0.5 (94 percent conversion). Then cooled to 70° C. and 0.26 g monomethyl ether of hydroquinone and 0.14 g of phenothiazine are added. Deionized water (762 g) is then added. The water and resin separated after 15 minutes. The system begins to phase separate after 5 minutes.

EXAMPLE V TIRE CORD ADHESIVE

A dispersion from Example II (20 g) is mixed with 1.2 g of hexamethoxymethylmelamine (Cymel 303), and 20.31 g of a 26.1 percent solids styrene-butadiene-vinyl pyridine (70/15/15 weight percent) latex and 30.99 g of deionized water.

The cord is dipped in water first to saturate the cord and then into the adhesive mixture described above to give a pickup of adhesive onto the cord of 4–5 weight percent. The cord is then placed into an oven to set the adhesive to the cord. Cure times and temperatures given in Table III. Five one-inch sections of cord coated with the vinyl ester resins dispersion are placed on top of a piece of uncured rubber in a mold along with 3 cords which are commercial polyester tire cords. Another piece of uncured rubber is placed on top of the cords. The rubber is then cured at 160° C. and 800 psi for 10 minutes. To test adhesion, the rubber mat is cut exactly one-fourth inch from the point of insertion of the cord, just deep enough to cut the cord. The mat is placed into a 110° C. oven for 30 minutes and then the load necessary to pull each cord out of the rubber measured using an Instron. Average pounds per inch are listed in Table III.

EXAMPLE VI

Of the dispersion from Example III, 17.78 g are mixed with 1.2 g of Cymel 303, 20.31 g of styrene-butadiene-vinylpyridine (70/15/15 weight percent) latex, and 33.21 g of water. This is tested the same as for Example V.

TABLE III

| Adhesive | Cure Time sec. | Cure Temp °C. | Adhesion | Aged 2 days 125° C. | Aged 7 days 100% humidity |
|---|---|---|---|---|---|
| Example V | 60 | 190 | 37.92 | 39.9 | 44.1 |
| Example VI | 60 | 190 | 38.76 | 43.8 | 43 |
| Commercial System | 45 60 | 149 246 | 47 | 56 | 55 |

Commercial Adhesive - 53 percent resorcinol-formaldehyde-triallylcyanurate 47 percent styrene-butadie-vinyl pyridine latex (15/70/15)
The commercial adhesive is a two-stage cure of 45 seconds at 300° F. and 60 seconds at 475° F.

Examples VII through IX demonstrate the additional utility of the aqueous vinyl ester resin dispersions as electrodepositable coatings.

EXAMPLE VII

The aqueous vinyl ester resin dispersion described in Example II is reduced to 15 weight percent solids with additional water. The pH is adjusted to 6.3 by adding a sufficient quantity of 10 weight percent aqueous N,N-dimethylethanolamine. To this is added 1 weight percent based on solids of tertiary tutyl perbenzoate. Panels (4"×12") of untreated, cleaned, cold-rolled steel are electrocoated by immersing the panels into an electrocoating bath consisting of 2 liters of the above formulation and using the panels as a cathode two inches from a carbon anode in this electrocoating bath. A voltage is then applied for 2 minutes. The panels are removed from the bath, rinsed with deionized water and baked in an oven. The resulting panel has a smooth hard uniform film. The voltage used for coating the panels and the baking conditions are shown in Table II.

EXAMPLE VIII

Resin is prepared as in Example II with the exception that 27.92 g (4 percent) of monobutylether of ethylene glycol is added as a solvent prior to the further reaction of the residual oxirane moieties with nicotinamide and lactic acid and the subsequent addition of water. The resin is blended with 2 percent tertiary butyl perbenzoate and 5 percent of 2-ethylhexanol. Coatings are made from this formulation by the process described in Example VII.

EXAMPLE IX

Resin was prepared as described in Example VIII except that the tertiary butyl perbenzoate and 2-ethylhexanol were replaced with 15 weight percent hexamethoxymethylmelamine (Cymel 303).

TABLE IV

| Resin | Voltage | Cure Time Min. | Cure Temp °C. | MEK Double Rubs |
|---|---|---|---|---|
| Example VII | 200 | 15 | 150 | 5 |
|  | 150 | 15 | 150 | 10 |
|  | 100 | 15 | 150 | 7 |
|  | 150 | 15/15 | 150/175 | 15 |
| Example VIII | 200 | 15 | 175 | >100 |
|  | 250 | 30 | 175 | >100 |
|  | 225 | 30 | 175 | >100 |
|  | 175 | 30 | 175 | >100 |
| Example IX | 200 | 30 | 150 | 25 |
|  | 175 | 30 | 150 | 16 |

The novel water-compatible compositions can be used as coating compositions applied by conventional techniques (e.g., dipping, spraying, brushing, roll coating, etc.). In coating applications, the novel water-compatible compositions are normally thinned with water to form aqueous solutions or more generally dispersed in water to form latexes. When used in electrodeposition, the formulation will normally have a charge/mass ratio of from about 0.2 to about 0.5 milliequivalent of pyridinium nitrogen per gram of solid, total resin solids basis.

What is claimed is:

1. A water-compatible composition comprising at least one vinyl ester resin comprising at least one terminal olefinically unsaturated group and at least one terminal pyridinium group covalently bonded through the pyridinium nitrogen atom.

2. The composition defined by claim 1, which additionally comprises at least one other water-insoluble resinous compound.

3. The composition defined by claim 2 wherein said other water-insoluble compound is a vinyl ester resin.

4. The composition defined by claim 1, wherein said terminal pyridinium group corresponds to the formula

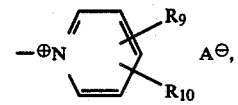

wherein $R_9$ and $R_{10}$ are each independently hydrogen, halo, hydrocarbyl, or inertly-substituted hydrocarbyl; and $A^\ominus$ is a compatible anion.

5. The composition defined by claim 4 wherein $R_9$ is hydrogen or a substituent in the 3- or 4-ring position and $R_{10}$ is hydrogen.

6. The composition defined by claim 5 wherein $R_9$ is carboxamide.

7. The composition defined by claim 4 wherein $A^\theta$ is chloride, bromide, bisulfate, bicarbonate, nitrate dihydrogen phosphate, lactate or an alkanoate of from 1 to 4 carbon atoms.

8. The composition defined by claim 1 wherein said vinyl ester resin has an epoxy equivalent weight greater than 500.

9. The composition of claim 8 wherein said vinyl ester resin has been partially reacted with a liquid carboxyterminated polydiene rubber.

10. The composition of claim 9 wherein said polydiene rubber is a copolymer of acrylonitrile and butadiene.

11. An aqueous dispersion comprising the composition defined by claim 1.

12. An aqueous dispersion comprising the composition as defined by claim 2.

13. A coating composition made from a dispersion of claim 12 and a free radical initiator.

14. The composition of claim 13 wherein said free radical initiator is tertiary-butyl-perbenzoate.

15. A process for preparing a water-compatible vinyl ester resin wherein an unsaturated monocarboxylic acid is reacted with an excess of a polyepoxide and that partially esterified polyepoxide reacted with a pyridine compound in the presence of sufficient amounts of a Brönsted acid and water to stabilize the so-formed pyridinium salt.

16. The process of claim 15 wherein the esterified pyridinium salt is blended with a vinyl ester resin in amounts that the blend is water compatible.

* * * * *